Patented July 4, 1950

2,514,088

UNITED STATES PATENT OFFICE 2,514,088

HEAT-TREATMENT FOR PLASTIC ARTICLES

Jules Pinsky, West Hartford, Conn., assignor to Plax Corporation, West Hartford, Conn., a corporation of Delaware No Drawing. Application July 23, 1948, Serial No. 40,423

6 Claims. (Cl. 18—48)

This invention relates to a process for treating polystyrene and methacrylate resins to avoid the formation of minute surface cracks, commonly referred to as crazing, which frequently appear as articles of these materials age. More particularly the invention relates to a heat treatment or annealing process that removes internal strains which produce the crazing.

Several processes have been suggested for preventing crazing of polystyrene and methacrylates. U. S. Patent No. 2,157,049, issued May 2, 1939, to Willard F. Bartoe discloses a process or treatment which consists generally in heating vinyl methacrylate articles to a sufficiently high temperature and for a sufficient period of time to permit unmolding and shrinkage. Such a process has the obvious disadvantage of unmolding or distorting the treated article.

While shrinkage normally is not greater than 2% for cast articles, when the same heat treatment is given extruded, drawn or otherwise formed articles having considerably greater molecular orientation than cast articles, resulting shrinkage is greater and highly oriented articles treated by the Bartoe process do not maintain their dimensions within permitted tolerances. Furthermore, this process does not prevent the reintroduction of craze-producing stresses.

The disadvantages of the Bartoe process are eliminated by another suggested process for removing internal strains and preventing crazing which involves heating polystyrene articles to their transition temperature for a time less than permits unmolding or distortion and thereafter controllably cooling to prevent the reintroduction of craze-producing stresses.

While this process successfuly avoids distortion and the reintroduction of craze-producing in polystyrene articles, it has the disadvantage of requiring a relatively long controlled heating and cooling cycle. Furthermore, its application to methacrylate is not entirely successful.

An object of the present invention is to provide an improved process for removing craze-producing stresses from both polystyrene and methacrylate products which avoids distortion and the reintroduction of the craze-producing stresses.

Another object is to provide a process of the type indicated which is applicable to both highly oriented and to unoriented articles.

A further object provides a heat treating cycle which requires considerably less time than those heretofore performed for the prevention of crazing in methacrylate and polystyrene products.

The heat treating cycle of the present invention for both polystyrene and methacrylate generally involves: (1) heating articles formed of these polymers for 15 to 30 minutes in a bath maintained at a temperature between 175° and 185° F.; (2) immediately quenching and retaining the articles for one hour in a bath maintained at 120° F.; and (3) air cooling.

In the case of articles formed of polystyrene and plasticized methyl methacrylate polymers of the type presently designed by duPont as their HM 122 and HM 129 methacrylate molding powders, a bath temperature of 185° F. is preferable for the initial heating step.

For articles formed of methyl methacrylate molding powders containing little if any plasticizer, and for those methacrylate polymers, such as Rohm and Haas's A-100 methacrylate molding powder, which contains ethyl methacrylate as a copolymer, a first-bath temperature of 175° F. is preferable.

A thirty minute exposure is necessary where the polymer requires a first-bath temperature of approximately 185° F., whereas only a fifteen minute exposure is necessary for those polymers requiring an approximate temperature of 175° F. Lesser time periods of exposure have proved satisfactory.

Departures from these preferred first-bath temperatures of more than 5° F. prevent successful removal of craze-producing strains and cracking generally occurs.

The preferable temperature of the second bath (120° F.) is the same regardless of the character of the styrene or methacrylate resin. While the second-bath temperature is less critical, variations of 10° F. adversely affect the effectiveness of the heat treatment.

The first bath must be water free for the successful treatment of methacrylate. The fluid of both the first and second baths must be one which does not attack the polymer and thereby weaken the surface strength to the point where internal strains produce crazing. Either ethylene glycol or a saturated salt bath, in which all the water present is in the form of water of crystallization, not as free water, is satisfactory. However, in the case of polystyrene, water is satisfactory for both the first and second heat treating baths.

The present invention provides a heat treatment cycle which successively prevents crazing without distorting the treated article. The treatment is applicable to molecularly oriented and to unoriented polystyrene and methacrylate articles. In the case of the methacrylate polymers the invention provides for the first time, a satisfactory craze preventing heat treatment which avoids distortion and, in the case of polystyrene, provides a treatment which is considerably faster than those heretofore successfully employed for highly molecular oriented and unoriented products.

While liquid baths are preferable, oven treatment using air or other gas may be employed.

Apparently the heat treated cycle of the present invention heats the material at a temperature sufficient to relieve those surface strains which tend to produce crazing and thereafter quenching at 120° F. introduces a second wave which prevents reintroduction of surface compression strains. Whatever the explanation, treated articles up to two inches in thickness have been found free from crazing after aging and despite exposure to weakening agents, such as kerosene for polystyrene and carbon tetrachloride for methacrylate, which effect crazing of identical products not treated in accordance with the process of the present invention.

I claim:

1. The process of heat-treating articles formed of a resin selected from the group consisting of polystyrene and methyl methacrylate polymer which comprises heating said articles for approximately thirty minutes in a first bath maintained within a temperature range of approximately 175–185° F., transferring and holding said articles for approximately one hour in a second bath maintained at a temperature of approximately 120° F., and cooling said articles in air at approximately room temperature.

2. The process of heat-treating articles formed of a resin selected from the group consisting of polystyrene and methyl methacrylate polymer which comprises heating said articles for at least thirty minutes in a first bath maintained within a temperature range of approximately 175–185° F., holding said articles for at least one hour in a second bath maintained at a temperature of approximately 120° F., and cooling said articles in air at approximately room temperature.

3. The process of heat-treating articles formed of a resin selected from the group consisting of polystyrene and methyl methacrylate polymer which comprises heating said articles at a temperature of approximately 185° F. for thirty minutes, quenching said articles in a medium maintained at approximately 120° F., retaining said articles in said medium for approximately one hour, and cooling said articles in air at room temperature.

4. The process of heat-treating substantially unplasticized methyl methacrylate resin articles which comprises heating said articles for one half hour in a first substantially water-free bath maintained at a temperature of approximately 185° F., cooling said articles for one hour in a second substantially water-free bath maintained at a temperature of approximately 120° F., and further cooling said articles in air at room temperature.

5. The process of heat-treating articles formed of a resin selected from the group consisting of polystyrene and methyl methacrylate polymer which comprises heating said articles in a first bath maintained at approximately the transition temperature and for a time less than permits plastic deformation, thereafter immediately quenching said articles in a second bath maintained at approximately 120° F., retaining said articles in said second bath for approximately one hour, and thereafter cooling said articles to room temperature.

6. The process of heat-treating articles formed of a resin selected from the group consisting of polystyrene and methyl methacrylate polymer which comprises heating said articles for approximately fifteen minutes in a first water-free bath maintained at approximately 175° F., quenching said articles in a second water-free bath maintained at a temperature of approximately 120° F., retaining said articles in said second bath for approximately one hour, and cooling said articles in air at room temperature.

JULES PINSKY.

REFERENCES CITED

The following references are of record in the file of this patent:

UNITED STATES PATENTS

| Number | Name | Date |
|---|---|---|
| 2,373,093 | Baker | Apr. 10, 1945 |
| 2,386,976 | Putnam | Oct. 16, 1945 |
| 2,402,221 | Wiley | June 18, 1946 |
| 2,425,501 | Wiley | Aug. 12, 1947 |
| 2,457,114 | Amenta | Dec. 28, 1948 |